US011041307B2

(12) United States Patent
Davis et al.

(10) Patent No.: US 11,041,307 B2
(45) Date of Patent: Jun. 22, 2021

(54) MULTIWALL SHEET AND METHODS OF USING THE SAME

(71) Applicant: SABIC GLOBAL TECHNOLOGIES B.V., Bergen op Zoom (NL)

(72) Inventors: Michael J. Davis, Mount Vernon, IN (US); Chinniah Thiagarajan, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 30 days.

(21) Appl. No.: 16/471,836

(22) PCT Filed: Dec. 27, 2017

(86) PCT No.: PCT/IB2017/058422
§ 371 (c)(1),
(2) Date: Jun. 20, 2019

(87) PCT Pub. No.: WO2018/122733
PCT Pub. Date: Jul. 5, 2018

(65) Prior Publication Data

US 2020/0095766 A1 Mar. 26, 2020

(30) Foreign Application Priority Data

Dec. 30, 2016 (IN) ............................ 201611045159

(51) Int. Cl.
*E04C 2/40* (2006.01)
*B29C 48/13* (2019.01)
(Continued)

(52) U.S. Cl.
CPC .............. *E04C 2/405* (2013.01); *B29C 48/13* (2019.02); *B29C 69/02* (2013.01); *B32B 1/00* (2013.01);
(Continued)

(58) Field of Classification Search
CPC ..... B29C 48/13; B29C 69/02; B29K 2069/00; B29K 2075/00; B29K 2105/04;
(Continued)

(56) References Cited

U.S. PATENT DOCUMENTS 2,101,836 A * 12/1937 Benedict ................. E04B 1/806 52/406.3
2,221,309 A * 11/1940 Gazelle ................. E04B 1/7654 428/186

(Continued)

FOREIGN PATENT DOCUMENTS

AU 2006201890 A1 5/2006
CN 2555317 A 6/2003

(Continued)

OTHER PUBLICATIONS

International Search Report issued in Application No. PCT/IB2017/058422, dated Apr. 19, 2018, 6 pages.

(Continued)

*Primary Examiner* — James M Ference
(74) *Attorney, Agent, or Firm* — Cantor Colburn LLP

(57) ABSTRACT

In one embodiment, a multiwall sheet can comprise: a first wall; a second wall; an intermediate wall disposed between the first wall and the second wall; a first set of ribs disposed between the first wall and the intermediate wall; a second set of ribs disposed between the second wall and the intermediate wall; a cavity disposed between adjacent ribs; wherein the multiwall sheet is configured to expand and/or collapse when a mechanical force (preferably shear force) is applied to the intermediate wall. Preferably the multiwall sheet has a flexural rigidity of greater than or equal to 10 N/mm.

17 Claims, 6 Drawing Sheets

(51) Int. Cl.

| | |
|---|---|
| ***B29C 69/02*** | (2006.01) |
| ***B32B 1/00*** | (2006.01) |
| ***B32B 3/08*** | (2006.01) |
| ***E04B 1/80*** | (2006.01) |
| ***E04B 1/82*** | (2006.01) |
| ***E04B 1/90*** | (2006.01) |
| ***E04C 2/34*** | (2006.01) |
| ***E04C 2/38*** | (2006.01) |
| ***E04C 2/54*** | (2006.01) |
| *B29K 69/00* | (2006.01) |
| *B29K 75/00* | (2006.01) |
| *B29K 105/04* | (2006.01) |
| *B29L 31/00* | (2006.01) |

(52) U.S. Cl.

CPC .................. *B32B 3/08* (2013.01); *E04B 1/80* (2013.01); *E04B 1/82* (2013.01); *E04B 1/90* (2013.01); *E04C 2/34* (2013.01); *E04C 2/38* (2013.01); *E04C 2/543* (2013.01); *B29K 2069/00* (2013.01); *B29K 2075/00* (2013.01); *B29K 2105/04* (2013.01); *B29L 2031/776* (2013.01)

(58) Field of Classification Search

CPC ....... B29L 2031/776; B32B 1/00; B32B 3/08; E04B 1/80; E04B 1/82; E04B 1/90; E04B 9/0414; E02C 2/34; E02C 2/38; E02C 2/405; E02C 2/543

See application file for complete search history.

(56) References Cited

U.S. PATENT DOCUMENTS 2,662,043 A * 12/1953 Clements ................ E04B 1/806 428/120
2,750,313 A * 6/1956 Schwartz .............. E04B 1/7654 52/406.3
2,786,004 A * 3/1957 Schwartz .............. E04B 1/7654 52/406.3
2,879,554 A * 3/1959 Wheeler ............... E04B 1/7654 52/793.1
3,112,532 A * 12/1963 Slowinski ............. E04B 2/7457 52/783.17
3,892,898 A * 7/1975 Yasui .................... B32B 29/005 428/116
3,951,730 A * 4/1976 Wennberg .............. B65D 65/44 428/116
3,975,882 A * 8/1976 Walter ...................... E04C 2/40 52/571
4,247,583 A * 1/1981 Roy .......................... B32B 3/12 428/116
4,313,422 A * 2/1982 McEntee ............... F24S 23/745 126/624
5,074,090 A * 12/1991 Hafers .................. E04B 2/7403 52/406.3
5,270,092 A * 12/1993 Griffith ..................... B32B 3/12 428/69
5,306,100 A * 4/1994 Higginbotham .......... B60P 7/18 206/593
5,356,251 A * 10/1994 Sisco ........................ B60P 7/16 206/593
5,424,113 A * 6/1995 Ray ........................... B32B 3/12 428/178
5,670,220 A * 9/1997 Skoien ................ B32B 37/0076 229/120.31
5,992,127 A * 11/1999 Quinif ....................... E04C 2/36 428/116
6,067,764 A * 5/2000 Johansen .................. E04C 2/32 52/302.1
6,183,836 B1 * 2/2001 Pflug ....................... E04C 2/365 428/116
6,832,461 B2 * 12/2004 Crye ......................... E04C 2/36 423/116
7,051,489 B1 * 5/2006 Swiszcz ................ E04B 9/0442 160/84.05
7,169,459 B2 * 1/2007 Lichodziejewski ....... B32B 3/20 428/188
7,207,151 B2 * 4/2007 Swiszcz .................. E04B 9/001 428/116
7,614,186 B2 * 11/2009 Maas ...................... E04C 2/543 52/171.3
D605,885 S 12/2009 Judkins
8,084,141 B2 * 12/2011 Dorsy ....................... E04C 2/08 428/596
8,393,080 B2 * 3/2013 Ballard, Jr. ............... E06B 9/42 29/897.312
8,475,894 B2 * 7/2013 Noble ...................... B27N 5/00 428/34.2
8,496,768 B2 * 7/2013 Holt .......................... E06B 9/24 156/65
8,544,240 B2 * 10/2013 Hughes, Jr. ............... E04C 2/22 52/783.17
8,889,248 B2 11/2014 Thiagarajan et al.
9,103,395 B2 * 8/2015 Chen ..................... F16F 9/0418
2002/0020142 A1 * 2/2002 Swiszcz ................ E04B 9/0414 52/783.1
2003/0159400 A1 * 8/2003 Forrester ............... E04C 2/3405 52/783.17
2005/0074566 A1 * 4/2005 Rouanet .................... E04C 2/54 428/34
2007/0248792 A1 * 10/2007 Conterno ................ B32B 27/08 428/116
2010/0112278 A1 * 5/2010 Thiagarajan ............ E04C 2/543 428/116
2013/0017361 A1 * 1/2013 Thiagarajan ............ E04C 2/543 428/117
2013/0052429 A1 * 2/2013 Thiagarajan ............ E04C 2/296 428/188
2015/0159366 A1 * 6/2015 Guerard .................... E04B 1/78 428/12
2020/0095766 A1 * 3/2020 Davis ........................ E04B 1/80

FOREIGN PATENT DOCUMENTS

| | | | |
|---|---|---|---|
| CN | 101525927 | A | 9/2009 |
| CN | 202323749 | U | 7/2012 |
| DE | 9408574 | U1 | 7/1994 |
| DE | 4437458 | A1 | 5/1996 |
| WO | 2013167542 | A1 | 11/2013 |

OTHER PUBLICATIONS

Written Opinion issued in Application No. PCT/IB2017/058422, dated Apr. 19, 2018, 8 pages.

* cited by examiner

MULTIWALL SHEET AND METHODS OF USING THE SAME

CROSS REFERENCE TO RELATED APPLICATIONS

This application is a National Stage application of PCT/IB2017/058422, filed Dec. 27, 2017, which claims the benefit of India Application No. 201611045159, filed Dec. 30, 2016, both of which are incorporated by reference in their entirety herein.

BACKGROUND

Multiwall sheets can serve as pre-fabricated materials for the construction of residential houses, industrial buildings, and/or low-cost emergency housing. For example, the multiwall sheets can serve as walls, flooring, panels, insulation, and/or roofing components. The flexural rigidity of a multiwall sheet can be increased by increasing the thickness of the sheet. However, this increase in thickness also corresponds to an increase in volume. Accordingly, transportation and/or storage of the sheets can become increasingly difficult. Multiwall sheets can be assembled on-site in an effort to address this problem. However, this approach can require the assembly of many components via complex machinery. Multiwall sheets can also fail due to inter-laminar forces that cause components of the sheets to become detached. This problem can be addressed by the addition of structural reinforcements. However, such an approach adds time and cost to the manufacturing process.

Thus, there is a need for a multiwall sheet with high flexural rigidity that can be easily manufactured, transported with a minimal volume, and then customized on-site to a desired thickness.

SUMMARY

Disclosed herein are multiwall sheets and methods of making and using the same.

In one embodiment, a multiwall sheet can comprise: a first wall; a second wall; an intermediate wall disposed between the first wall and the second wall; a first set of ribs disposed between the first wall and the intermediate wall; a second set of ribs disposed between the second wall and the intermediate wall; a cavity disposed between adjacent ribs; wherein the multiwall sheet is configured to expand and/or collapse when a mechanical force (preferably shear force) is applied to the intermediate wall. Preferably the multiwall sheet has a flexural rigidity of greater than or equal to 10 N/mm.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
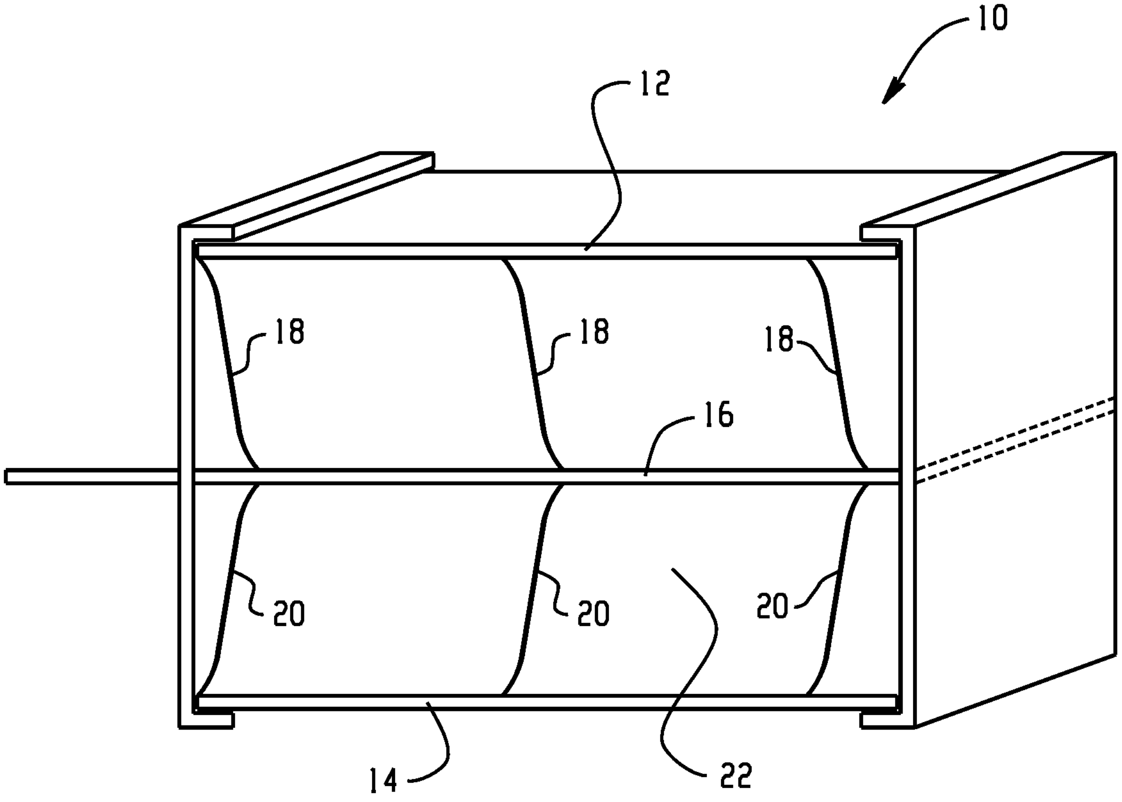
FIG. 1 is schematic diagram depicting an embodiment of a multiwall sheet.

The structure disclosed herein can provide a multiwall sheet with high flexural rigidity (e.g., greater than or equal to 10 N/mm) that can be easily manufactured, transported with a minimal volume, and then customized on-site to a desired thickness. For example, the multiwall sheet disclosed herein can provide ease of manufacture, delivery, and on-site use. For example, the multiwall sheet can be extruded as one part, collapsed to a desired thickness, transported in the collapsed state, and then expanded on site to a desired thickness. For example, the volume of the multiwall sheet can be reduced by greater than or equal to 50%, e.g., prior to shipping, transport, storage, and/or delivery. Additionally, the thickness of the multiwall sheets can be customized on-site, thereby enabling the sheets, for example, to be used for a variety of functions. Accordingly, the ease and cost effectiveness of transport, as well as the uses of the sheets, are greatly increased.

For example, the multiwall sheets can serve as pre-fabricated materials for the construction of residential buildings, industrial buildings, and/or low-cost emergency housing. For example, the multiwall sheets can serve as walls, flooring, panels, insulation, and/or roofing components.

As is known, regular wind pressure (e.g., low risk applications) is 500 $N/m^2$, while high risk situations relate to wind pressures of 5,000 $N/m^2$. The multiwall sheet disclosed herein can withstand high levels of pressure, for example wind pressures of greater than or equal to 5,000 Newton per meter squared ($N/m^2$), even greater than or equal to 7,500 $N/m^2$.

The flexural rigidity of the multiwall sheet (slope of total wind pressure load vs deflection) can be greater than or equal to 10 Newton per millimeter (N/mm), for example greater than or equal to 20 N/mm, or greater than or equal to 25 N/mm, or greater than or equal to 100 N/mm, or greater than or equal to 300 N/mm.

The multiwall sheets can provide a significant improvement in thermal performance (U-value reduction) as thickness of the multiwall sheet is increased. Accordingly, the thermal performance of the multiwall sheets can be customized on-demand at any given location by varying thickness of the multiwall sheet. The multiwall sheets can include secure locking mechanisms. The sheets can also allow filler materials to be included in-situ for on-demand improvement of structural, thermal, acoustical, aesthetical, solar, optical, electrical and magnetic properties.

The multiwall sheet can comprise a first wall, a second wall, and an intermediate wall. The first wall can be different from, or the same as, the second wall. The intermediate wall(s) can be disposed between the first wall and the second wall. The multiwall sheet can comprise ribs within a first set of ribs. This first set of ribs can be disposed between the first wall and the intermediate wall. The multiwall sheet can further comprise ribs within a second set of ribs. The second set of ribs can be disposed between the second wall and the intermediate wall. The ribs within a first set of ribs can be different from, or the same as, the ribs within a second set of ribs. The multiwall sheet can comprise a cavity disposed between adjacent ribs. For example, if the multiwall sheet comprises multiple ribs, then the multiwall sheet can comprise multiple cavities disposed between those ribs. The multiwall sheet can further comprise multiple intermediate walls and/or multiple sets of rib.

The first set of ribs can be arranged in symmetrical manner relative to the second set of ribs. For example, the first set of ribs and the second set of ribs can mirror each other in shape and size. The first set of ribs can be arranged in an asymmetrical manner relative to the second set of ribs. For example, the first set of ribs and the second set of ribs can be arranged in a staggered pattern. For example, the first and second sets of ribs can be arranged so that there is no vertical alignment between ribs of different sets. The ribs can be deformable. For example, the ribs can comprise polycarbonate material that allows the ribs to bend and/or flex without breaking. The deformability of the ribs can allow flexion of the ribs at a point of attachment between the ribs and the walls of the multiwall sheet. For example, this flexion can allow movement of the walls and ribs. Ribs within a set of ribs can be spaced apart a distance from each other. For example, the space between ribs can be greater than or equal to a length of the ribs. This spacing can prevent ribs from interfering with each other during movement of the ribs and/or walls.

The walls of the multiwall sheet can have a thickness that is greater than or equal to the thickness of the ribs. For example, the thickness ($T_w$) of the first wall and/or second wall can be 1.1 to 50, preferably 1.1 to 10, times greater than the thickness of the ribs ($T_r$). In other words, $T_w \geq 1.1T_r$; preferably $T_w \geq 3T_r$, or $T_w \geq 10T_r$. The intermediate wall can have a thickness that is greater than or equal to the thickness of the first wall and/or second wall. For example, the thickness of the intermediate wall can be 1.1 to 10 times greater than the thickness of the first and/or second wall. A relatively low rib thickness, as compared to wall thickness, can contribute to the deformability of the ribs.

The multiwall sheet can be configured to expand and/or collapse when a mechanical force (e.g. shear force) is applied to one or more of the walls. For example, the multiwall sheet can begin in an expanded state. A mechanical force can then be applied to the first wall, the second wall, and/or the intermediate wall, resulting in a collapsed multiwall sheet. The deformability of the ribs can allow the flexion needed to achieve collapse and/or expansion of the multiwall sheet. Accordingly, when going from an expanded state to a collapsed state, the volume of the cavities and the overall thickness of the multiwall sheet can be significantly decreased. For example, a thickness of the multiwall sheet when collapsed can be have a thickness of less than or equal to 70% (preferably less than or equal to 50%, or less than or equal to 40%, or less than or equal to 30%) of the thickness of the sheet when maximally expanded. With the present design, the collapsed thickness can be as small as the sum of the thickness of first wall, second wall and ribs. The process may also occur in reverse. For example, the multiwall sheet can begin in a collapsed state. A mechanical force can then be applied to the first wall, the second wall, and/or the intermediate wall, resulting in an expanded multiwall sheet.

The expansion and/or collapsing process can occur repeatedly from one state to another. In other words, an expanded multiwall sheet can be collapsed by a mechanical force and then expanded back to an expanded state. The mechanical force can be applied in any direction and can be applied to a single wall or any number of walls. The mechanical force can be applied by hand, by mechanical means, or by any other suitable means. It is also noted that an infinite number of incremental states exits between fully collapsed and maximum expansion of the multiwall sheet. Accordingly, the multiwall sheet can be partially expanded and/or partially collapsed allowing a user to customize the thickness and volume of the multiwall sheet.

To allow a user to secure the multiwall sheet at a desired thickness, the multiwall sheet can comprise a locking mechanism. For example, the locking mechanism can comprise locking segment(s) that interlock with side wall(s) of the multiwall sheet. The locking segments can protrude from the first wall, the second wall, the intermediate wall, or a combination comprising at least one of the foregoing. The locking mechanism works in tandem with first, second and intermediate walls. The force applied at the intermediate wall to lock, is balanced by the first and second wall at the endcap.

Figure 3:
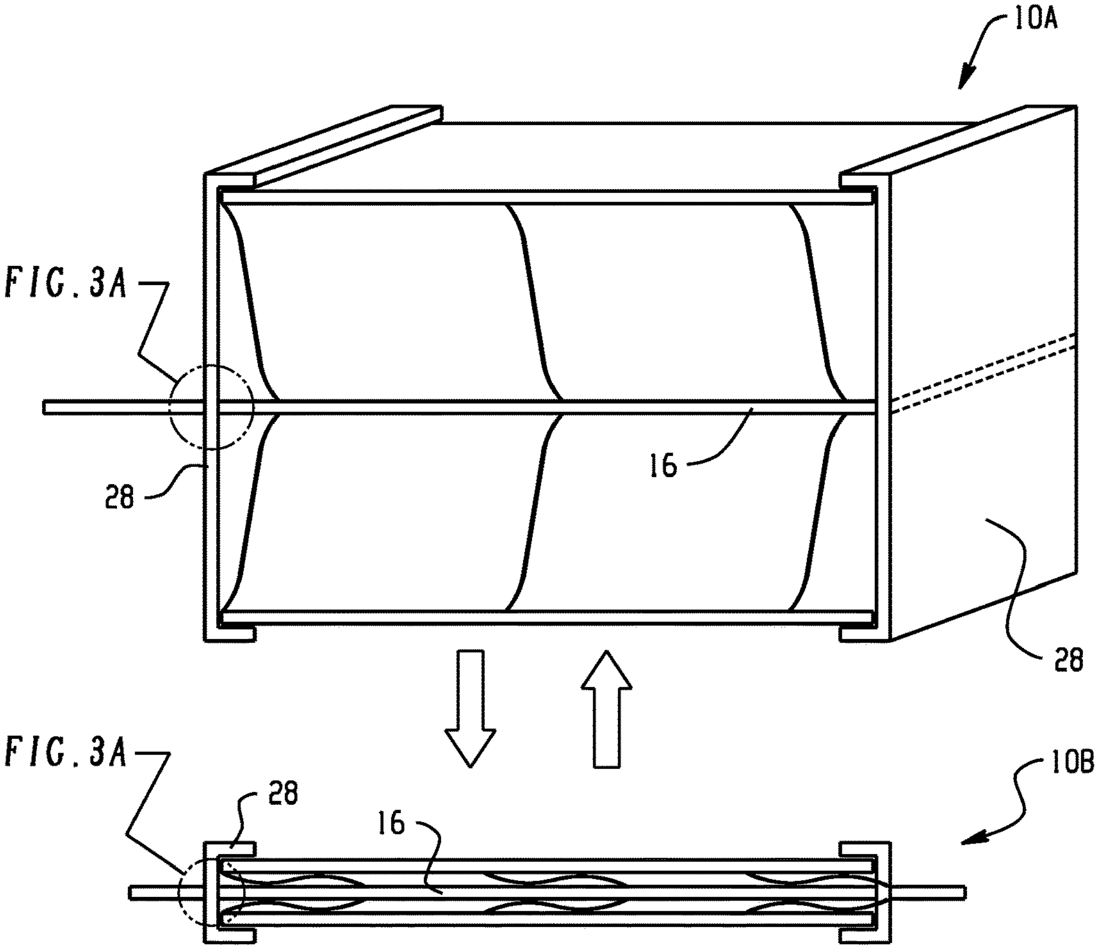
FIG. 3 is a schematic diagram depicting a multiwall sheet in the collapsed position with locking segment.

The side walls can be located on any side of the multiwall sheet. Once a desired thickness of the multiwall sheet is achieved via expansion and/or collapse, a side wall can be placed at a side of the sheet so as to engage with the locking segments. This attaches the side wall to the multiwall sheet, preventing further movement of the walls and securing the sheet at the desired thickness. Multiple locking segments can be used to create an incremental locking mechanism with the side walls (as depicted in FIG. 3). For example, the multiwall sheet can be locked into a maximally expanded state, a fully collapsed state, or some partially expanded and/or collapsed state that exists in between these two extremes. Accordingly, the thickness and volume of the multiwall sheet can be customized on-site by a user and then securely locked by locking segments. The locking segments can be permanent or temporary. For example, in addition to mechanical locking (with the locking segments), bonding can be employed, using permanent or temporary adhesive.

The multiwall sheet disclosed herein can therefore provide ease of manufacture, delivery, and on-site use. For example, the multiwall sheet can be extruded as one part, collapsed to a desired thickness, transported in the collapsed state, and then expanded on site to a desired thickness.

The multiwall sheet can be further configured to receive filler material. A filler delivery apparatus, for example a tube, can be inserted into a cavity of the sheet and used to inject filler material into the cavity. For example, the filler material can be injected on-site to allow for customization. The injection of filler material can also contribute to expansion of the multiwall sheet. For example, an expanding material, such as expanding foam, can be injected into a cavity of a collapsed multiwall sheet. Upon expansion of the foam material within the cavity, the multiwall sheet itself is also forced to expand. The filler material can occupy one or more cavities within the multiwall sheet. For example, a single filler material can be used throughout the multiwall sheet or multiple different filler materials can be used. The filler materials can be present in any form of alternating and/or random patterns. For example, any two adjacent cavities can comprise the same filler material or a different filler material. Examples of filler materials can include sand, dirt, air, liquid, foam, such as expanding foam, polyurethane, such as polyurethane beads, and fibrous materials. Accordingly, through choice of filler material and filler pattern, the thermal, optical, structural, electrical, etc. properties of the multiwall sheet can be customized.

The multiwall sheet can be formed from polymeric materials, such as thermoplastics and thermoplastic blends. Examples of thermoplastics include polyalkylenes (e.g., polyethylene, polypropylene, polyalkylene terephthalates (such as polyethylene terephthalate, polybutylene terephthalate)), polycarbonates, acrylics, polyacetals, styrenes (e.g., impact-modified polystyrene, acrylonitrile-butadiene-styrene, styrene-acrylonitrile), poly(meth)acrylates, polyetherimide, polyurethanes, polyphenylene sulfides, polyvinyl chlorides, polysulfones, polyetherketones (polyether etherketones, polyether ketone ketones, and so forth), as well as combinations comprising at least one of the foregoing. Examples of thermoplastic blends comprise acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether etherketone/polyethersulfone, polyethylene/nylon, polyethylene/polyacetal, and the like.

Additives can be employed to modify the performance, properties, or processing of the polymeric material. Examples of additives comprise antioxidants, such as, organophosphites, for example, tris(nonyl-phenyl)phosphite, tris(2,4-di-t-butylphenyl)phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)] methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioacyl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, mica and other additives; such as, for example, mold release agents, UV absorbers, stabilizers such as light stabilizers and others, lubricants, plasticizers, pigments, dyes, colorants, anti-static agents, blowing agents, flame retardants, and impact modifiers, among others. Optionally, the fillers and reinforcing agents can be in the form of fibers, (including continuous and chopped fibers).

A coating(s) can be disposed on any wall surface to improve the properties of the multiwall sheet. Examples of coatings include antifungal coatings, hydrophobic coatings, hydrophilic coatings, light dispersion coatings, anti-condensation coatings, scratch resistant coatings, and the like, as well as combinations comprising at least one of the foregoing.

A multiwall sheet can be formed from polymer processing methods, such as extrusion or injection molding. For example, the multiwall sheet can be extruded as a single unitary structure. Continuous production methods, such as extrusion, generally offer improved operating efficiencies and greater production rates than non-continuous operations, such as injection molding. Specifically, a single screw extruder can be employed to extrude a polymer melt (e.g., polycarbonate, such as LEXAN™, commercially available from SABIC Innovative Plastics). The polymer melt is fed to a profile die capable of forming an extrudate having the cross-section of the multiwall sheet 10 illustrated in FIG. 1. The multiwall sheet can be extruded at different levels of expansion and/or collapse. For example, the ribs can be extruded at greater than, less than, or equal to a 45 degree angle with the intermediate wall, preferably extruded at greater than or less than a 45 degree angle with the intermediate. The multiwall sheet 10 travels through a sizing apparatus (e.g., vacuum bath comprising sizing dies) and is then cooled below its glass transition temperature (e.g., for polycarbonate, 297° F. (147° C.)). After the panel has cooled, it can be cut to the desired length utilizing an extrusion cutter, such as an indexing in-line saw. Once cut, the multiwall sheet can be subjected to secondary operations before packaging.

Examples of secondary operations can include annealing, printing, attachment of fastening members, trimming, further assembly operations, and/or any other desirable processes. Coextrusion methods can also be employed for the production of the multiwall sheet 10. Coextrusion can be employed to supply different polymers to any portion of the multiwall sheet's geometry to improve and/or alter the performance of the panel and/or to reduce raw material costs. In one embodiment, a coextrusion process can be employed to reduce raw material costs by supplying a less expensive polymer to non-structural sections (e.g., foamed or recycled materials). One skilled in the art would readily understand the versatility of the process and the myriad of applications in which coextrusion can be employed in the production of multiwall sheets. The multiwall sheet 10 can also be constructed from multiple components. In multi-component multiwall sheets, the sheet can comprise a multitude of components that can be individually formed from different processes and assembled utilizing a multitude of methods.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Referring now to FIG. 1, a multiwall sheet 10 can comprise a first wall 12, a second wall 14, and an intermediate wall 16. For example, the intermediate wall 16 can be disposed between the first wall 12 and the second wall 14. The multiwall sheet 10 can comprise ribs 18 within a first set of ribs. The ribs 18 can be disposed between the first wall 12 and the intermediate wall 16. The multiwall sheet 10 can further comprise ribs 20 within a second set of ribs. The ribs 20 can be disposed between the second wall 14 and the intermediate wall 16. The multiwall sheet 10 can comprise a cavity 22 disposed between adjacent ribs 18 and/or 20. For example, if the multiwall sheet comprises multiple ribs 18 and/or 20, then the multiwall sheet can comprise multiple cavities 22. The multiwall sheet 10 can further comprise multiple intermediate walls 16 and/or multiple sets of rib 18, 20.

Figure 2:
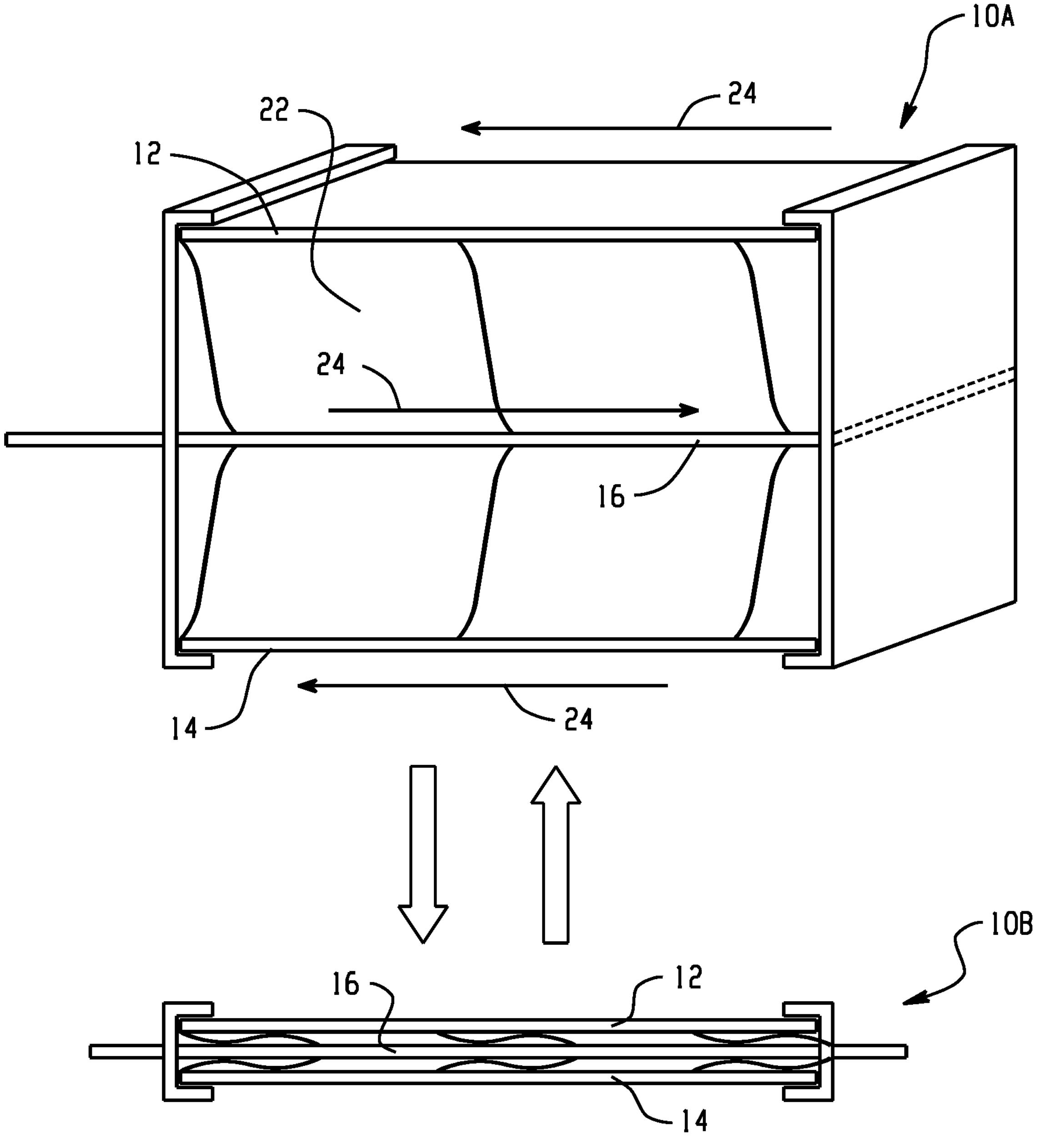
FIG. 2 is schematic diagram depicting the application of mechanical force to a multiwall sheet such that the sheet changes from the expanded position to the collapsed position.

Referring now to FIG. 2, the multiwall sheet 10 can be configured to expand and/or collapse when a mechanical force 24 is applied to the first wall 12, the second wall 14, the intermediate wall 16, or a combination comprising at least one of the foregoing. For example, the multiwall sheet 10 can begin in an expanded state 10A. A mechanical force 24 can then be applied to the first wall 12, the second wall 14, and/or the intermediate wall 16, resulting in a collapsed multiwall sheet 10B. As can be seen from FIG. 2, when going from an expanded state 10A to a collapsed state 10B, the volume of the cavities 22 and the overall thickness of the multiwall sheet 10 can be significantly decreased. The process may also occur in reverse. For example, the multiwall sheet 10 can begin in a collapsed state 10B. A mechanical force 24 can then be applied to the first wall 12, the second wall 14, and/or the intermediate wall 16, resulting in an expanded multiwall sheet 10A. As can be seen from FIG. 2, when going from a collapsed state 10B to an expanded state 10A, the volume of the cavities 22 and the overall thickness of the multiwall sheet 10 can be significantly increased.

This expansion and/or collapsing process can occur repeatedly from one state to another. For example, an expanded multiwall sheet 10A can be collapsed to state 10B by a mechanical force 24 and then expanded back to an expanded state 10A. The directions of the mechanical force 24 depicted in FIG. 2 are not limiting and can be interchangeable and can be applied to a single wall or any number of walls 12, 14, and 16. It is also noted that an infinite number of incremental states exits between full collapse and maximum expansion of the multiwall sheet 10. Accordingly, the multiwall sheet 10 can be partially expanded and/or collapsed allowing a user to customize the thickness and volume of the multiwall sheet 10.

Figure 3A:
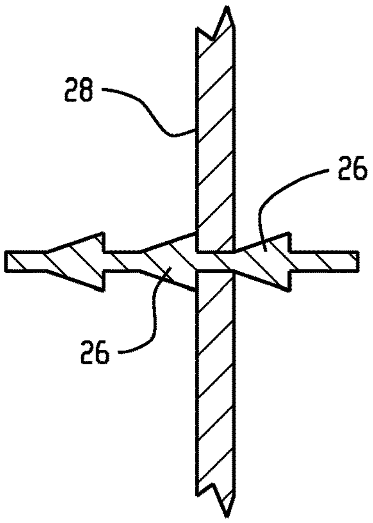
FIG. 3A is an expanded view of the locking segment of the collapsed sheet of FIG. 3.

Referring now to FIGS. 3 and 3A, the multiwall sheet 10 can further comprise a locking segment(s) 26. For example, the locking segment 26 can protrude from the intermediate wall 16. Similarly, the locking segments 26 can also protrude from the first wall 12 and/or the second wall 14. The multiwall sheet 10 can further comprise a side wall(s) 28. For example, the side wall 28 can extend from the first wall 12 to the second wall 14. The side walls 28 can be located on any side of the multiwall sheet 10. The side wall 28 can be configured to interlock with the locking segments 26. As depicted in FIG. 3A, multiple locking segments 26 can be used to create an incremental locking mechanism with the side wall 28. For example, the multiwall sheet 10 can be locked into a maximally expanded state 10A, a fully collapsed state 10B, or some partially expanded and/or collapsed state that exists in between these two extremes. Accordingly, the thickness and volume of the multiwall sheet 10 can be customized on-site by a user and then securely locked by locking segments 26.

Figure 4:
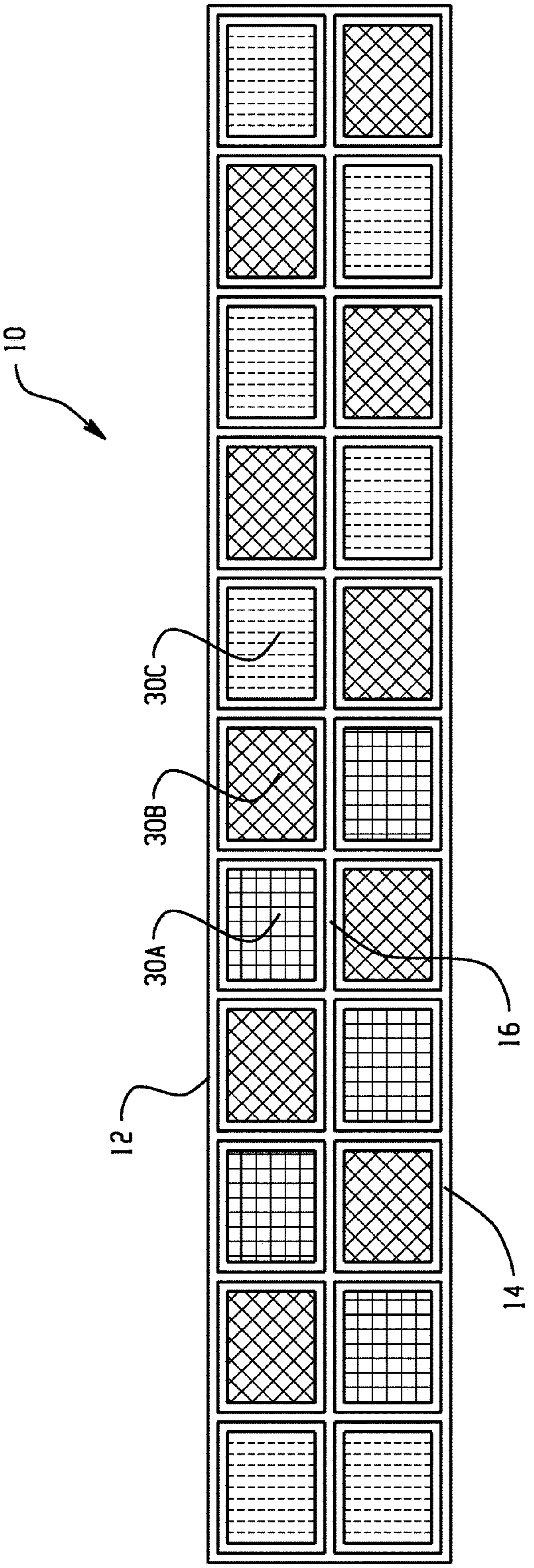
FIG. 4 is a schematic diagram depicting varying fillers occupying the cavities of multiwall sheets.

Referring now to FIG. 4, the multiwall sheet 10 can be configured to receive filler material 30. For example, the filler material 30 can occupy one or more cavities 22 within the multiwall sheet 10. For example, a single filler material 30 can be used throughout the multiwall sheet 10 or multiple different filler materials 30 can be used. For example, filler materials 30A, 30B, and/or 30C can be used, wherein the materials are all different from each other. The filler materials 30 can be present in any form of alternating and/or random patterns. For example, any two adjacent cavities 22 can comprise the same filler material 30 or a different filler material 30. For example, a random pattern is depicted in FIG. 4 comprising three different filler materials 30A, 30B, and 30C. As described herein, filler materials can include sand, dirt, air, liquid, foam, polyurethane, and fibrous materials. Accordingly, through choice of filler material and filler pattern, the thermal, optical, structural, electrical, etc. properties of the multiwall sheet 10 can be customized.

The following examples are merely illustrative of the multiwall sheets disclosed herein and are not intended to limit the scope hereof.

EXAMPLES

TABLE 1

| Material Description | | |
|---|---|---|
| Component | Description | Source |
| PU foam | Polyurethane foam, density = 62 kg/$m^3$ | SABIC Innovative Plastics |
| PC | Polycarbonate, density = 1,200 kg/$m^3$, thermal conductivity = 0.21 W/m K, specific heat = 2200 J/kg K | SABIC Innovative Plastics |

Example 1

Structural performance is tested using multiwall sheets in accordance with the present disclosure. Computer simulations (geometric nonlinear structural analysis) are used for the purposes of this example using Generic Industry standard Multiphysics Computer Aided Engineering Simulation Software. Multiwall sheet Samples 1-5 are prepared and tested. Multiwall sheet length is 2 times the width to represent longer sheet lengths. Side wall thickness is 2 millimeters (mm). Sheet support edge engagement is 20 mm Sheets are clamped on all 4 sides of the multiwall sheet. Rib thickness is 0.3 mm A wind pressure of 1000 Newton per meter squared (N/$m^2$) is used. Filler is not used for the purposes of this example. The remaining features of Samples 1-5 are varied for comparison purposes and can be seen in Table 2.

TABLE 2

| Dimensions | | | | | | | |
|---|---|---|---|---|---|---|---|
| Sample | Total sheet thickness (mm) | Sheet width (mm) | Wall thick-ness (mm) | Wind pressure (N/$m^2$) | Weight (kg) | Expanded | Side walls |
| 1 | 16 | 600 | 0.65 | 1000 | 2.7 | Yes | No |
| 2 | 16 | 600 | 1.00 | 1000 | 4.0 | No | Yes |
| 3 | 16 | 600 | 0.65 | 1000 | 2.7 | No | Yes |
| 4 | 24 | 600 | 1.00 | 1000 | 4.04 | Yes | Yes |
| 5 | 24 | 1000 | 1.00 | 1000 | 2.7 | Yes | Yes |

Simulation results for Samples 1-5 can be seen in Table 3. Von Mises Stress is measured in MegaPascals (MPa) and flexural rigidity is measured in Newton per millimeter (N/mm). Sample 5 (with side walls) shows a flexural rigidity that is 37% greater than Sample 1 (no side walls). Sample 5 (expanded) shows a flexural rigidity that is 2 times greater than Sample 3 (not expanded). The results provided in Table 3 demonstrate that the structural performance of the multiwall sheets can be improved on-demand at any given location, for example by varying the expansion of the multiwall sheet and implementing side walls.

TABLE 3

| Results | | | |
|---|---|---|---|
| Sample | Deflection (mm) | Von Mises Stress (MPa) | Flexural Rigidity (N/mm) |
| 1 | 30.7 | 42.3 | 19.54 |
| 2 | 34.8 | 49.2 | 17.24 |
| 3 | 44.4 | 49.9 | 13.51 |
| 4 | 25.2 | 33.2 | 23.81 |
| 5 | 22.3 | 45.7 | 26.91 |

Example 2

The effects of filler material on structural performance are tested using multiwall sheets in accordance with the present disclosure. Computer simulations (geometric nonlinear structural analysis) are used for the purposes of this example. Multiwall sheet Samples 1-5 are prepared and tested. Multiwall sheet weight is 2.7 kg. Multiwall sheet length is 2 times width. Side wall thickness is 2 mm Sheet edge engagement is 20 mm Sheet is clamped on all 4 sides of the multiwall sheet. Filler used is 1.4 kg of PU foam. Rib thickness is 0.3 mm. The remaining features of Samples 1-5 are varied for comparison purposes and can be seen in Table 4.

TABLE 4

| Dimensions | | | | | | | |
|---|---|---|---|---|---|---|---|
| Sample | Total sheet thickness (mm) | Sheet width (mm) | Wall thickness (mm) | Wind pressure (N/m$^2$) | PU foam filler | Ribs | Side walls |
| 1 | 24 | 600 | 0.65 | 1000 | No | Yes | Yes |
| 2 | 24 | 600 | 0.65 | 1000 | Yes | Yes | Yes |
| 3 | 32 | 600 | 0.65 | 1000 | Yes | Yes | Yes |
| 4 | 24 | 600 | 0.65 | 1000 | Yes | No | Yes |
| 5 | 24 | 1000 | 1.00 | 7500 | Yes | Yes | No |

Figure 6:
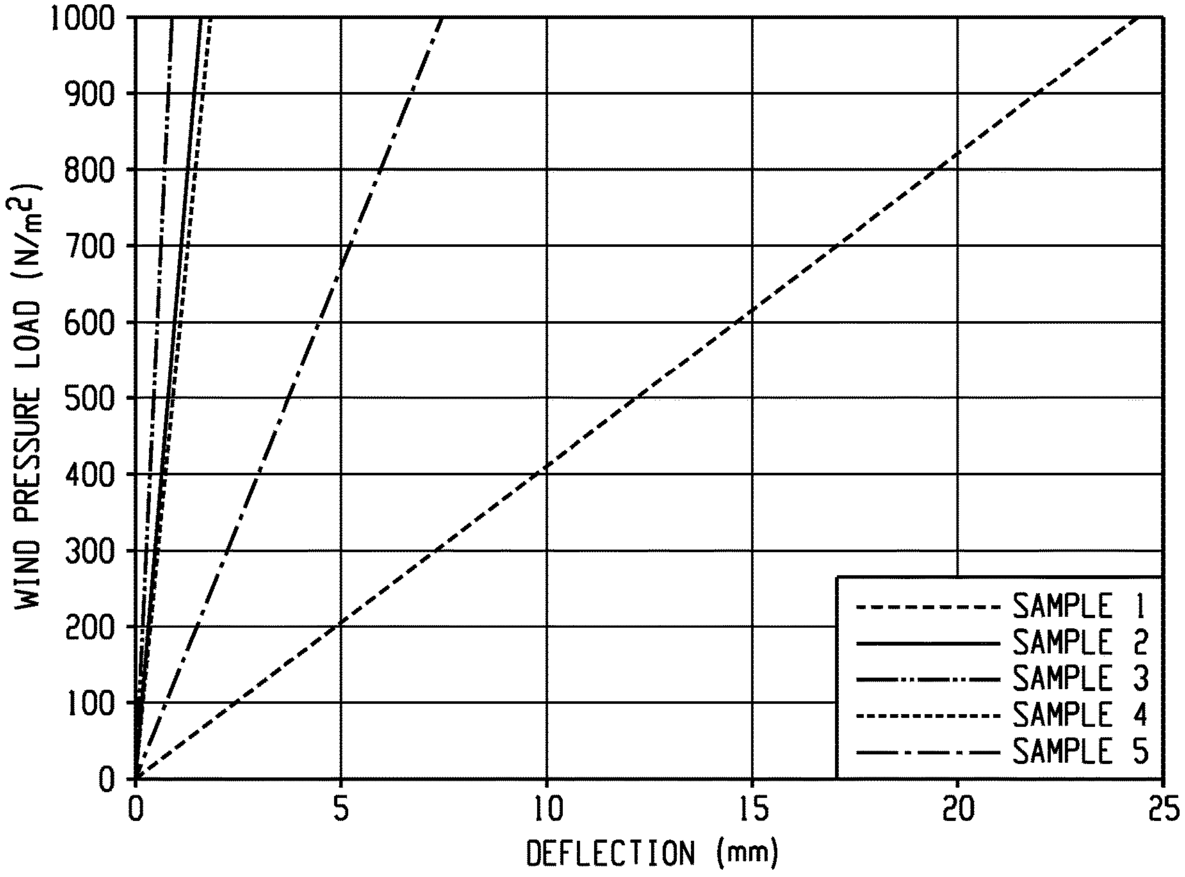
FIG. 6 is a graph depicting the flexural rigidity of multiwall sheets.

Simulation results for Samples 1-5 can be seen in Table 5 and FIG. 6. Sample 2 (with filler) shows a flexural rigidity that is 14 times greater than Sample 1 (no filler). Sample 3 (total sheet thickness of 32 mm) shows a flexural rigidity that is 25 times greater than Sample 1. Sample 2 (with ribs) shows a 12% reduction in deflection as compared to Sample 4 (no ribs). The presence of supporting ribs also reduces the delamination of the walls of the multiwall sheet. Conventional sandwich or thick panel are made using discrete first, second and third walls without integral ribs and hence can fail usually by delamination mode. In the present multiwall sheet, the ribs hold together the top first and bottom third wall. Sample 5 (no side walls) demonstrates the ability of the multiwall sheet to withstand high levels of pressure (wind pressure of 7500 N/m$^2$).

TABLE 5

| Results | | | |
|---|---|---|---|
| Sample | Deflection (mm) | Von Mises Stress (MPa) | Flexural Rigidity (N/mm) |
| 1 | 24.40 | 27.10 | 24.59 |
| 2 | 1.58 | 12.70 | 379.75 |
| 3 | 0.92 | 7.48 | 652.17 |
| 4 | 1.80 | 5.70 | 333.33 |
| 5 | 56.70 | 80.00 | 132.28 |

Example 3

Thermal performance is tested using multiwall sheets in accordance with the present disclosure. Computer simulations (thermal analysis) are used for the purposes of this example. 2D heat transfer analysis in accordance with EN ISO 10211:2007(E) is used. Walls and ribs are made from PC. It is assumed for the purposes of this example that principle heat flow through the multiwall sheet is perpendicular to a plane parallel to the external and internal surfaces. It is also assumed that the emissivity of the surfaces adjoining the air cavities is 0.9 (ISO 10077-2:2012). The thermal conductivity of the air cavities is in accordance with ISO (ISO 10077-2:2012). The U-value is in accordance with ISO 10211. Internal and external heat transfer coefficients for the U-value prediction are in accordance with ISO 10077-2:2003 (E)/EN 673. The external heat transfer coefficient is 25 W/m$^2$K and the internal heat transfer coefficient is 7.7 W/m$^2$K. A temperature difference 20° C. is used.

Figure 5:
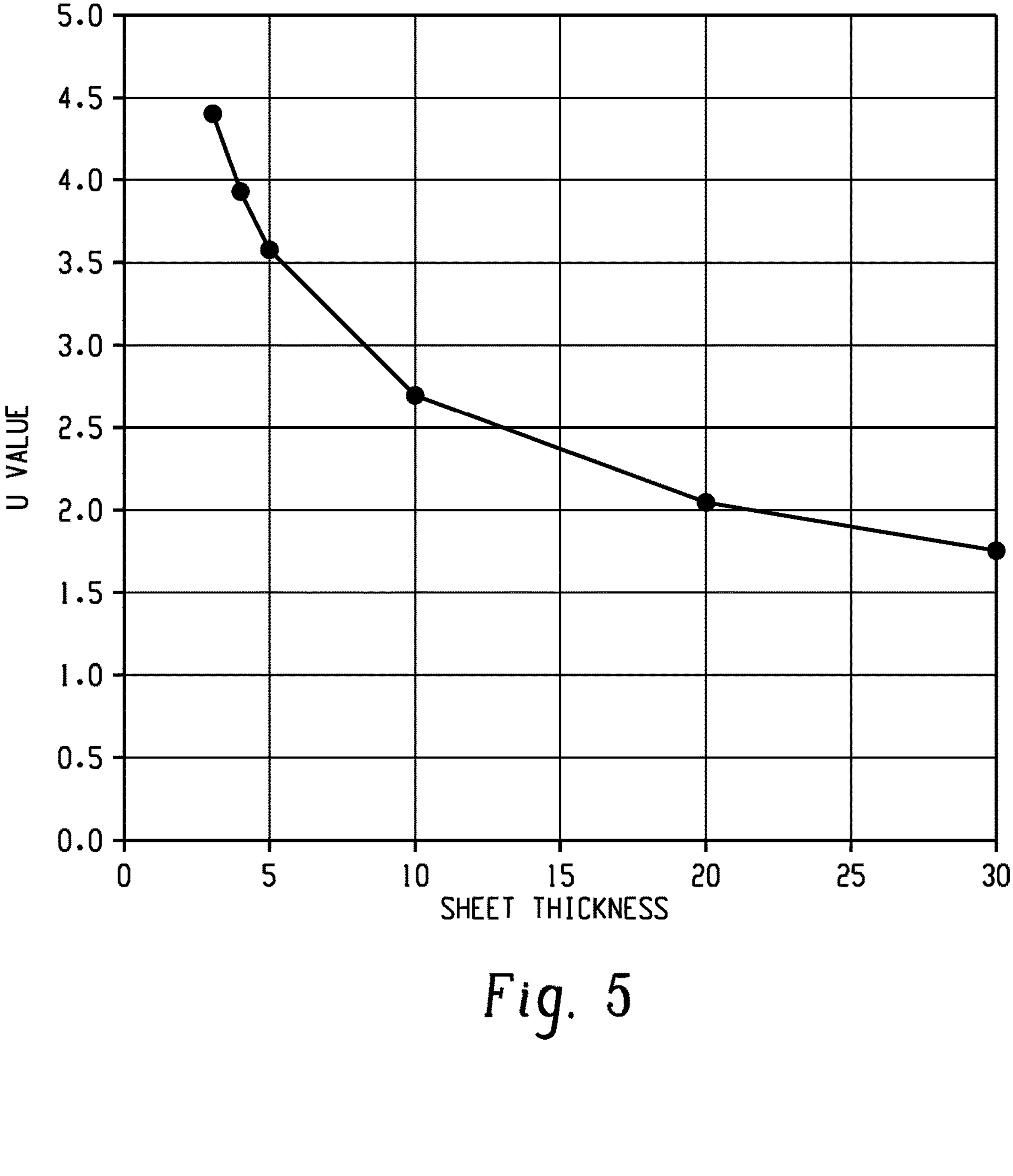
FIG. 5 is a graph depicting the thermal performance of multiwall sheets.

Simulation results (FIG. 5) demonstrate a significant improvement in thermal performance (U-value reduction) as thickness of the multiwall sheet is increased. U-value is measured in W/m$^2$K and sheet thickness is measured in mm. Accordingly, the thermal performance of the multiwall sheets can be customized on-demand at any given location by varying thickness of the multiwall sheet.

The processes disclosed herein include(s) at least the following embodiments:

Embodiment 1

A multiwall sheet, comprising: a first wall; a second wall; an intermediate wall disposed between the first wall and the second wall; a first set of ribs disposed between the first wall and the intermediate wall; a second set of ribs disposed between the second wall and the intermediate wall; a cavity disposed between adjacent ribs; wherein the multiwall sheet is configured to expand and/or collapse when a mechanical force (preferably shear force) is applied to the intermediate wall. Preferably the multiwall sheet has a flexural rigidity of greater than or equal to 10 N/mm.

Embodiment 2

The multiwall sheet of Embodiment 1, further comprising a locking segment, wherein the locking segment protrudes from the intermediate wall.

Embodiment 3

The multiwall sheet of Embodiment 2, further comprising a side wall, wherein the side wall extends from the first wall to the second wall and is configured to interlock with the locking segment.

Embodiment 4

The multiwall sheet of any of the preceding embodiments, wherein the cavity is configured to receive a filler material, wherein the filler material comprises sand, liquid, polyurethane foam, fibrous insulation, or a combination comprising at least one of the foregoing; preferably some cavities comprise one filler material and other cavities comprise a different filler material.

Embodiment 5

The multiwall sheet of Embodiment 4, wherein adjacent cavities are occupied by different filler materials.

Embodiment 6

The multiwall sheet of any of the preceding embodiments, wherein the multiwall sheet comprises thermoplastic, preferably comprise polycarbonate.

Embodiment 7

The multiwall sheet of any of the proceeding embodiments, wherein the multiwall sheet is configured to expand and/or collapse repeatedly on demand.

Embodiment 8

The multiwall sheet of any of the preceding embodiments, wherein the ribs are reconfigurable.

Embodiment 9

The multiwall sheet of any of the preceding embodiments, wherein the first set of ribs is symmetrical as compared with the second set of ribs.

Embodiment 10

The multiwall sheet of any of the preceding embodiments, wherein the first set of ribs is asymmetrical as compared with the second set of ribs.

Embodiment 11

The multiwall sheet of any of the preceding embodiments, wherein a space between adjacent ribs is greater than or equal to a length of the ribs.

Embodiment 12

The multiwall sheet of any of the preceding embodiments, wherein a thickness of the first wall and/or second wall is greater than a thickness of the ribs.

Embodiment 13

The multiwall sheet of Embodiment 12, wherein the thickness of the first wall and/or second wall is 1.1 to 50 times greater than the thickness of the ribs.

Embodiment 14

The multiwall sheet of any of the preceding embodiments, wherein a thickness of the intermediate wall is greater than a thickness of the first wall and/or second wall.

Embodiment 15

The multiwall sheet of any of the proceeding embodiments, wherein a thickness of the multiwall sheet when maximally expanded is 5 to 10 times greater than a thickness of the multiwall sheet when fully collapsed.

Embodiment 16

The multiwall sheet of any of the preceding embodiments, wherein the multiwall sheet is configured to function as a roof, cover, wall, panel, floor, window glazing, thermal insulation, structural member, acoustical barrier, electromagnetic shield or a combination comprising at least one of the foregoing.

Embodiment 17

A method of forming a multiwall sheet, comprising: extruding the multiwall sheet as a single unitary structure; wherein the multiwall sheet comprises a first wall, a second wall, an intermediate wall disposed between the first wall and the second wall, a first set of ribs disposed between the first wall and the intermediate wall, a second set of ribs disposed between the second wall and the intermediate wall, a cavity disposed between adjacent ribs, wherein the multiwall sheet is configured to expand and/or collapse when a mechanical force, preferably a shear force, is applied to the first wall, the second wall, the intermediate wall, or a combination comprising at least one of the foregoing, and wherein a flexural rigidity of the multiwall sheet is greater than or equal to 25 Newtons per millimeter (N/mm).

Embodiment 18

The method of Embodiment 17, wherein the ribs are extruded at a 40 to 50 degree angle relative to the intermediate wall.

Embodiment 19

The method of Embodiment 17 and Embodiment 18, wherein the multiwall sheet further comprises a locking segment, wherein the locking segment protrudes from the intermediate wall.

Embodiment 20

The method of Embodiment 17-19, further comprising injecting expanding foam into a cavity of the multiwall sheet.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms “first,” “second,” and the like, herein do not denote any order, quantity, or importance, but rather are used to denote one element from another. The terms “a” and “an” and “the” herein do not denote a limitation of quantity, and are to be construed to cover both the singular and the plural, unless otherwise indicated herein or clearly contradicted by context. “Or” means “and/or.” The suffix “(s)” as used herein is intended to include both the singular and the plural of the term that it modifies, thereby including one or more of that term (e.g., the film(s) includes one or more films). Reference throughout the specification to “one embodiment”, “another embodiment”, “an embodiment”, and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The terms “front”, “back”, “bottom”, and/or “top” are used herein, unless otherwise noted, merely for convenience of description, and are not limited to any one position or spatial orientation. “Optional” or “optionally” means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A multiwall sheet, comprising:

a first wall;

a second wall;

an intermediate wall disposed between the first wall and the second wall;

a first set of ribs disposed between the first wall and the intermediate wall;

a second set of ribs disposed between the second wall and the intermediate wall; and a cavity disposed between adjacent ribs of the first set of ribs and the second set of ribs;

wherein the multiwall sheet is configured to expand and/or collapse when a mechanical force is applied to the intermediate wall; and further comprising a side wall configured to attach to the multiwall sheet after an expansion and/or collapse, wherein the side wall extends from the first wall to the second wall and is configured to interlock with the locking segment.

2. The multiwall sheet of claim 1, wherein the cavity is configured to receive a filler material, wherein the filler material comprises sand, liquid, polyurethane foam, fibrous insulation, or a combination thereof.

3. The multiwall sheet of claim 2, wherein the cavity comprises a plurality of cavities and adjacent cavities of the plurality of cavities are occupied by different filler materials.

4. The multiwall sheet of claim 1, wherein the multiwall sheet comprises polycarbonate, thermoplastic, or a combination thereof.

5. The multiwall sheet of claim 1, wherein the multiwall sheet is configured to re-expand after an initial collapse and/or re-collapse after an initial expansion when a mechanical force is applied to the intermediate wall.

6. The multiwall sheet of claim 1, wherein the first set of ribs and the second set of ribs are reconfigurable.

7. The multiwall sheet of claim 1, wherein the first set of ribs is symmetrical as compared with the second set of ribs.

8. The multiwall sheet of claim 1, wherein the first set of ribs is asymmetrical as compared with the second set of ribs.

9. The multiwall sheet of claim 1, wherein a space between adjacent ribs of the first set of ribs and second set of ribs is greater than or equal to a length of the adjacent ribs.

10. The multiwall sheet of claim 1, wherein a thickness of the first wall and/or second wall is greater than a thickness of a rib of the first and second sets of ribs.

11. The multiwall sheet of claim 10, wherein the thickness of the first wall and/or second wall is 1.1 to 50 times greater than the thickness of a rib of the first and second sets of ribs.

12. The multiwall sheet of any of claim 1, wherein a thickness of the intermediate wall is greater than a thickness of the first wall and/or second wall.

13. The multiwall sheet of claim 1, wherein a thickness of the multiwall sheet when maximally expanded is 5 to 10 times greater than a thickness of the multiwall sheet when fully collapsed.

14. The multiwall sheet of claim 1, wherein the multiwall sheet is configured to function as a roof, cover, wall, panel, floor, window glazing, thermal insulation, structural member, acoustical barrier, electromagnetic shield or a combination thereof.

15. A method of forming a multiwall sheet, comprising:

extruding the multiwall sheet as a single unitary structure;

wherein the multiwall sheet comprises a first wall, a second wall, an intermediate wall disposed between the first wall and the second wall, a first set of ribs disposed between the first wall and the intermediate wall, a second set of ribs disposed between the second wall and the intermediate wall, and a cavity disposed between adjacent ribs of the first set of ribs and the second set of ribs, wherein the multiwall sheet is configured to expand and/or collapse when a mechanical force is applied to the first wall, the second wall, the intermediate wall, or a combination thereof, and further comprising a side wall configured to attach to the multiwall sheet after an expansion and/or collapse, wherein the side wall extends from the first wall to the second wall and is configured to interlock with the locking segment, and wherein a flexural rigidity of the multiwall sheet is greater than or equal to 10 N/mm.

16. The method of claim 15, wherein the first set of ribs and the second set of ribs are extruded at a 40 to 50 degree angle relative to the intermediate wall.

17. The method of claim 15, further comprising injecting expanding foam into the cavity of the multiwall sheet.

* * * * *